(12) United States Patent
Mao et al.

(10) Patent No.: US 7,766,251 B2
(45) Date of Patent: Aug. 3, 2010

(54) FUEL INJECTION AND MIXING SYSTEMS AND METHODS OF USING THE SAME

(75) Inventors: Chien-Pei Mao, Clive, IA (US); John Short, Norwalk, IA (US)

(73) Assignee: Delavan Inc, West Des Moines, IA (US)

( * ) Notice: Subject to any disclaimer, the term of this patent is extended or adjusted under 35 U.S.C. 154(b) by 1135 days.

(21) Appl. No.: 11/317,119

(22) Filed: Dec. 22, 2005

(65) Prior Publication Data
US 2007/0158451 A1 Jul. 12, 2007

(51) Int. Cl.
*B05B 1/24* (2006.01)
(52) U.S. Cl. .............................. 239/13; 239/5; 239/128; 239/135; 239/432; 239/433; 239/533.3; 239/584; 239/585.1; 123/549
(58) Field of Classification Search ...................... 239/5, 239/13, 128, 135, 403, 426, 432, 433, 434, 239/463, 585, 533.3, 533.12, 584, 585.1; 123/304, 549
See application file for complete search history.

(56) References Cited

U.S. PATENT DOCUMENTS

| | | | |
|---|---|---|---|
| 3,731,876 A | | 5/1973 | Showalter |
| 3,868,698 A | | 2/1975 | Dressler |
| 4,659,014 A | | 4/1987 | Soth et al. |
| 4,770,151 A | | 9/1988 | Finlay |
| 5,054,458 A | * | 10/1991 | Wechem et al. ............. 123/549 |
| 5,248,087 A | | 9/1993 | Dressler |
| 5,758,826 A | * | 6/1998 | Nines .................... 239/533.12 |
| 6,162,046 A | | 12/2000 | Young et al. |
| 6,238,815 B1 | | 5/2001 | Skala et al. |
| 6,338,472 B1 | | 1/2002 | Shimazu et al. |
| 6,508,236 B2 | * | 1/2003 | Amou et al. ................ 123/549 |

(Continued)

FOREIGN PATENT DOCUMENTS

DE  10 2004 055 425 A1  5/2006

(Continued)

OTHER PUBLICATIONS

International Search Report dated Apr. 20, 2007.

(Continued)

*Primary Examiner*—Steven J Ganey
(74) *Attorney, Agent, or Firm*—Scott D. Wofsy; Edwards Angell Palmer & Dodge LLP

(57) ABSTRACT

A fuel injection and mixing system is provided. The system includes an injector body having a fuel inlet and a fuel outlet, and defines a fuel flow path between the inlet and outlet. The fuel flow path may include a generally helical flow passage having an inlet end portion disposed proximate the fuel inlet of the injector body. The flow path also may include an expansion chamber downstream from and in fluid communication with the helical flow passage, as well as a fuel delivery device in fluid communication with the expansion chamber for delivering fuel. Heating means is also provided in thermal communication with the injector body. The heating means may be adapted and configured for maintaining the injector body at a predetermined temperature to heat fuel traversing the flow path. A method of preheating and delivering fuel is also provided.

19 Claims, 10 Drawing Sheets

U.S. PATENT DOCUMENTS

| | | | |
|---|---|---|---|
| 6,592,052 B2 * | 7/2003 | Hokao | 239/135 |
| 6,601,776 B1 | 8/2003 | Oljaca et al. | |
| 6,627,342 B1 | 9/2003 | Nakamura et al. | |
| 6,630,244 B1 | 10/2003 | Horowitz et al. | |
| 6,641,084 B1 | 11/2003 | Huber et al. | |
| 6,752,124 B1 | 6/2004 | Chang | |
| 6,760,212 B2 | 7/2004 | Cheever, Jr. et al. | |
| 6,803,029 B2 | 10/2004 | Dieckmann | |
| 6,866,024 B2 | 3/2005 | Rizzoni et al. | |
| 2004/0000296 A1 | 1/2004 | Linna et al. | |
| 2004/0086436 A1 | 5/2004 | Boltze et al. | |
| 2004/0124259 A1 | 7/2004 | Guezennec et al. | |
| 2005/0081833 A1 | 4/2005 | Pellizzari et al. | |
| 2005/0210877 A1 | 9/2005 | Rabinovich et al. | |
| 2006/0159437 A1 * | 7/2006 | Miller | 392/485 |

FOREIGN PATENT DOCUMENTS

| | | |
|---|---|---|
| EP | 0903184 | 3/1999 |
| EP | 1 243 630 A2 | 9/2002 |
| EP | 1243 630 A2 | 9/2002 |
| EP | 1252679 | 10/2002 |
| EP | 1 571 726 A1 | 9/2005 |
| EP | 1571726 A1 | 9/2005 |
| FR | 2417018 | 9/1979 |
| GB | 944 845 A | 12/1963 |
| WO | WO 94/05906 | 3/1994 |
| WO | WO 01/54219 A1 | 7/2001 |
| WO | WO 2004/035188 | 4/2004 |
| WO | WO 2004/050257 A1 | 6/2004 |
| WO | WO 2004/065782 | 8/2004 |
| WO | WO 2004/091758 A1 | 10/2004 |
| WO | WO 2006/053534 A1 | 5/2006 |

OTHER PUBLICATIONS

International Search Report dated Apr. 25, 2007.
European Search Report dated Jul. 16, 2007.

* cited by examiner

FUEL INJECTION AND MIXING SYSTEMS AND METHODS OF USING THE SAME

GOVERNMENT SUPPORT

The Government has rights in this invention, pursuant to Contract No. DE-FC26-04NT42229 awarded by the U.S. Department of Energy.

FIELD OF THE INVENTION

The present invention relates to fuel injection and mixing systems and related methods of mixing fuel and, more particularly, to integrated fuel injection and mixing systems for use with fuel reformers to generate hydrogen-rich gas for use in fuel cells and related methods of mixing fuel.

BACKGROUND OF THE INVENTION

Fuel cells are alternative energy producing systems that generate electricity from common fuel sources such as natural gas and that, typically, have higher efficiencies and lower emissions than conventional systems. More specifically, fuel cells are electro-mechanical devices that provide electrical power by converting chemical energy stored in the form of hydrogen and oxygen. The hydrogen and oxygen gases are supplied to the fuel cells and are combined through chemical reaction to generate water, heat and electricity in the process.

In addition to high manufacturing cost, the fuel cell industry is faced with several critical challenges that must be resolved before fuel cell systems can be fully commercialized for widespread power generation applications. These challenges include, without limitation: innovative anode/electrolyte/cathode materials for lower electrochemical losses; durable fuel cell interconnects; improved sealing concepts; compatible metallic interconnects; advanced stack cooling; low-cost fabrication processes; understanding of soot/carbon deposit mechanisms; efficient fuel reformer; and fuel desulfurization systems.

There are different types of fuel cells, which include, among others, phosphoric acid, proton exchange membrane, molten carbonate, solid oxide, and alkaline. Among the various types of fuel cells, the solid oxide fuel cell ("SOFC") exhibits many advantages over the other fuel cell systems for power generation. For example, the SOFC has the highest energy efficiency and can tolerate low-cost catalytic materials. Moreover, existing studies indicate that the SOFC system is probably one of the most reliable power generation technologies. Further, the SOFC is best suited for integration with conventional gas turbine engines for improvements in fuel consumption and emission pollution. Most importantly, the SOFC system can operate directly with liquid hydrocarbon fuels, being able to utilize the existing refueling infrastructure fully. Because of these significant advantages, the fuel cell industry has been working diligently to develop compact, efficient, fuel reformers that can effectively convert liquid hydrocarbon fuels into hydrogen-rich gas for SOFC systems used in auxiliary power units.

Liquid hydrocarbon fuels can be reformed to produce hydrogen-rich gas through partial oxidation, steam or auto-thermal reforming. The major requirements for the fuel reformer system used with the SOFC include simple construction, small size and weight, low manufacturing cost, lower operating pressure and temperature, high conversion efficiency, carbon and sulfur tolerance, multi-fuel capability, maximum thermal integration, low maintenance intervals, rapid startup, and acceptable transient response.

A review of the existing fuel processing technologies indicates that most fuel reformers are in the prototype and demonstration stage. In short, current, state-of-the-art fuel reformers are not yet capable of meeting the stringent requirements for commercial or military applications. Particularly, current, state-of-the-art fuel reformers are heavy in weight, large in physical size, and provide only moderate conversion efficiency. Furthermore, most of the fuel reformers are vulnerable to carbon formation, necessitating either frequent cleaning or high oxygen/carbon ("O/C") ratios for sustained operation. Operating at high O/C ratios, however, reduces the overall system efficiency. Also, the existing catalysts used for the reformers cannot tolerate significant sulfur levels and thus require the liquid fuels to be desulfurized.

Another major difficulty for SOFC reformers germane to the present invention involves the atomization and mixing of liquid fuel with heated air and/or superheated steam. Failure to provide a uniform fuel vapor mixture prior to entering the catalytic reactor can result in hot spots and carbon formation. Moreover, non-uniform gas streams within the mixing chamber and/or catalytic reactor also could lead to significant performance degradation and reduced reformer efficiency. Finally, the catalytic reactor also may encounter a significant pressure drop due to carbon or soot deposits and build-up, which would necessitate additional pressure or momentum to force the gas streams through the catalytic reactor.

Referring to FIG. 1, there is shown a conventional fuel reformer system 10. Typically, a fuel reformer system 10 comprises a fluid injector 1 and a mixing chamber 2 that is connected to a catalytic reactor 3. Ideally, the fluid injector 1 is mounted to or otherwise operatively associated with a mixing chamber 2. The fluid injector/mixing chamber combination supplies a uniform or nearly uniform fuel vapor mixture to the catalytic reactor 3, which produces a hydrogen-rich gas.

More particularly, liquid hydrocarbon fuels, such as diesel fuel, jet fuel, gasoline, kerosene or the like, can be supplied to a fluid injector 1, for example, via a control valve 6. To assist fuel atomization, a heated gas stream 4 is simultaneously supplied to the fluid injector, e.g., through a regulator valve 7. Depending on the reformer type, the atomizing gas stream 4 could be either steam flow or heated airflow. For steam- and auto-thermal-type reformers, steam flow is used as the atomizing gas stream 4. Partial oxidation-type catalytic reformers use heated airflow as the atomizing gas stream 4.

For most fuel reforming applications, it also is preferred that a uniform, secondary fluid flow 5 be supplied to the mixing chamber 2 and, more specifically, the uniform, secondary fluid flow 5 be supplied around the outlet of the fluid injector 1. Providing such a uniform, secondary fluid flow 5 enhances the mixing process and also minimizes liquid fuel droplets from adhering or otherwise attaching to the walls of the mixing chamber 2. A controller 8 can be used to adjust the required flow rates for all three feed streams. More specifically, the controller 8 can control the flow of liquid fuel to the fluid injector 1 by controlling valve 6 and can control the delivery of steam flow or heated airflow to the fluid injector 1 and/or mixing chamber 2 by controlling control valve 7. The fluid injector 1 is also equipped with a temperature controller 9 and is usually mounted on top of the mixing chamber 2, supplying a uniform fuel vapor mixture for the catalytic reactor 3 to generate hydrogen-rich syngas.

To develop a compact, efficient fuel reformer system, it would be desirable to provide an integrated fuel injection and mixing system that can overcome the technical problems enumerated above. It also would be desirable to provide an injection and mixing system that could be easily integrated into various types of fuel reformers. Not only must the new fuel injection system demonstrate better conversion efficiency, it must also be more compact in size with fewer components and lower manufacturing cost. Finally, it would be desirable to provide an injection and mixing system that can demonstrate extended service life without the problem of carbon or coke deposition.

SUMMARY OF THE INVENTION

The purpose and advantages of the present invention will be set forth in and apparent from the description that follows, as well as will be learned by practice of the invention. Additional advantages of the invention will be realized and attained by the methods and systems particularly pointed out in the written description and claims hereof, as well as from the appended drawings.

To achieve these and other advantages and in accordance with the purpose of the invention, as embodied herein and broadly described, a fuel injection system is provided. The system includes an injector body having a fuel inlet and a fuel outlet and defines a fuel flow path between the inlet and outlet. The fuel flow path may include a generally helical flow passage having an inlet end portion disposed proximate the fuel inlet of the injector body. The flow path also may include an expansion chamber downstream from and in fluid communication with the helical flow passage, as well as a fuel delivery device in fluid communication with the expansion chamber for delivering fuel. Heating means is also provided in thermal communication with the injector body. The heating means may be adapted and configured for maintaining the injector body at a predetermined temperature to heat fuel traversing the flow path.

In accordance with a further aspect of the invention, the flow path can further include an annular cavity in fluid communication with and located between the helical flow passage and the fuel inlet. The outlet end portion of the helical flow path may be connected to the expansion chamber by way of one or a plurality of feed holes.

In accordance with a further aspect of the invention, the injector body can be configured to define an elongate cavity for receiving a portion of the heating means. The heating means can include a thermocouple in thermal communication with a portion of the injector body, wherein the thermocouple is adapted and configured to detect the temperature of the injector body. The heating means may further include a cartridge heater adapted and configured to heat the injector body. The cartridge heater may be disposed in the cavity defined in the injector body. The heating means can further include a power source and a temperature controller. The temperature controller is in operable communication with the thermocouple, the cartridge heater, and the power source. The temperature controller is adapted and configured to apply electrical power from the power source to the cartridge heater in response to a signal received from the thermocouple indicative of the temperature of the injector body. The thermocouple can be disposed proximate the fuel outlet of the injector body, for example.

In accordance with a further aspect of the invention, at least a portion of the flow path of the injector body can be coated with a coating resistant to formation of carbon deposits thereon. The coating can be chosen, for example, from the group consisting of polymeric and ceramic materials.

In further accordance with the invention, a fuel injection and mixing system is provided. The system preferably includes an injection housing having a fuel injector and at least one gas injector as described herein. The system also includes a mixing chamber in fluid communication with the outlet of the injector housing for mixing fine droplets of liquid fluid from the fuel injector with at least a second fluid from the gas injector to provide a fuel vapor mixture. The system also includes a mixer structured and arranged in the mixing chamber for stabilizing and mixing of the fuel vapor mixture.

In accordance with one aspect of the invention, the mixer can include a first plurality of radially disposed vanes adapted and configured to impose a helical flow on fluid passing through the mixer. The mixer can be further provided with a second plurality of radially disposed vanes adapted and configured to impose a helical flow on fluid passing therethrough. The second plurality of vanes can be disposed radially outwardly of the first plurality of vanes. The first plurality of vanes may impose a helical flow that is opposite in rotation to the flow imposed by the second plurality of vanes. A perforated member disposed in the mixing chamber may also be provided for creating a uniform fuel mixture.

In accordance with another aspect of the invention, the injection housing can further include an air injector proximate the outlet of the fuel injector for injecting air into the mixing chamber. The injection housing may also include a second injector proximate the outlet of the fuel injector for injecting steam or gas recycled from the anode of a fuel cell into the mixing chamber. One or both of the injectors can be adapted and configured to impart rotation to flow passing through the mixing chamber.

In accordance with still a further aspect of the invention, the fuel injection and mixing system can further include a control system for controlling the flow of fluids into the mixing chamber to form a fuel vapor mixture. A plurality of controllable valves can be provided, wherein each controllable valve is adapted and configured to control the flow of fluids into the system. The control system can accordingly include a valve controller operably coupled to the plurality of valves, wherein the valve controller is adapted and configured to control the flow of fluids into the system by operating the controllable valves. As described herein, the heating means can include a thermocouple, a heater, and a power source in operable communication with a temperature controller that is adapted and configured to apply electrical power from the power source to the heater in response to a signal received from the thermocouple indicative of the temperature of the injector body.

If desired, the control system can further include a machine readable program containing instructions for controlling the fuel injection system. The program can include, for example, means for operating the temperature controller to maintain the temperature of the injector body at the predetermined temperature and for heating fuel traversing the flow path. If desired, the program can also include means for operating the valve controller to modulate the flow of fluids into the system to form a fuel mixture in the mixing chamber.

In accordance with another aspect of the invention, the invention provides a fuel injection and mixing system having an injection housing including a fuel injector and a gas injector. The system also includes a mixing chamber in fluid communication with the injection housing, the mixing chamber being adapted and configured to facilitate mixing of fluids exiting the fluid injector. The mixing chamber also includes a mixer, wherein the mixer includes a peripheral wall having an axially converging-diverging undulating surface.

In accordance with a further aspect of the invention, the peripheral wall of the mixer may be provided with a generally circular cross section that transitions into an undulating cross section in the direction of fluid flow. The undulating cross section of the peripheral wall of the mixer can be provided with a plurality of lobes. For example, the undulating cross section of the peripheral wall of the mixer can include three or more interconnected lobes. In accordance with one embodiment of the invention, the cross section of the peripheral wall of the mixer includes six interconnected lobes. However, any suitable number of lobes, such as eight, ten, twelve or more lobes, for example, is also possible.

In accordance with still a further aspect of the invention, the mixing chamber can include an inlet portion disposed proximate the outlet of the fluid injector, a neck portion disposed downstream of the inlet portion and a body portion disposed downstream of the neck portion. In accordance with one embodiment, the mixer is disposed in the neck portion of the mixing chamber. If desired, the mixer can define a peripheral downstream edge having an undulating cross section. Moreover, the peripheral downstream edge can be sloped to direct liquid droplets of fluid collecting on the peripheral wall of the mixer toward the wall of the mixing chamber. This can be effective in preventing large fuel droplets from entering downstream components, such as a fuel reformer entrance.

In accordance with a further aspect of the invention, at least one perforated member can be disposed in the mixing chamber for creating a uniform fuel mixture. If desired, a plurality of perforated members can be disposed in the mixing chamber. In accordance with one embodiment of the invention, the total porosity of the at least one perforated member is less than about 70%.

A variety of fuel delivery devices can be used in accordance with the system of the invention. For example, the fuel delivery device can be a simplex-type injector or a siphon-type injector. If desired, the system may be adapted and configured to deliver fuel to a fuel reformer chosen from the group consisting of a steam reformer, a catalytic partial oxidation reformer, and an auto thermal reformer. If the fuel reformer is a catalytic partial oxidation reformer, the fluid injector can include a first gas injector proximate the outlet of the fuel injector for injecting air into the mixing chamber, and a second gas injector proximate the outlet of the fuel injector for injecting recycle gas from the anode of a fuel cell into the mixing chamber. If the fuel reformer is an auto thermal reformer, the fluid injector can include a first gas injector proximate the outlet of the fuel injector for injecting air into the mixing chamber, and a second gas injector proximate the outlet of the fuel injector for injecting steam into the mixing chamber.

In accordance with another aspect of the invention, the invention includes a method of providing a fuel vapor mixture. The method preferably includes the steps of directing fuel into the fuel inlet of an injector body along a predetermined fuel flow path, simultaneously heating and pressurizing the fuel traversing the fuel flow path, expanding the heated and pressurized fuel so as to promote atomization, atomizing the expanded fuel and directing the fuel through a fuel delivery device.

In accordance with a further aspect of the invention, the method can further include the step of directing fuel from the fuel delivery device into a mixing chamber. If desired, a second fluid can be introduced into the mixing chamber to form a fuel mixture. The second fluid can be air, for example. A third fluid can also be introduced into the mixing chamber to modify the fuel mixture. The third fluid can be steam or anode gas recycled from an anode of a fuel cell, for example.

In accordance with still a further aspect of the invention, the fuel can be heated by applying heat to the injector body. The injector body can be maintained at a predetermined temperature, if desired. The predetermined temperature may be sufficient to establish two-phase fuel flow through at least a portion of the fuel flow path. Furthermore, the predetermined temperature may be sufficient to evaporate all of the fuel to establish a gas flow through at least a portion of the fuel flow path. The method may also include the step of delivering fuel to an entrance of a fuel reformer.

It is to be understood that both the foregoing general description and the following detailed description are exemplary and are intended to provide further explanation of the invention claimed.

The accompanying drawings, which are incorporated in and constitute part of this specification, are included to illustrate and provide a further understanding of the method and system of the invention. Together with the description, the drawings serve to explain the principles of the invention.

BRIEF DESCRIPTION OF THE DRAWINGS

For a fuller understanding of the nature and desired objects of the present invention, reference is made to the following detailed description taken in conjunction with the accompanying figures. In the drawings, like reference characters generally refer to the same parts throughout the different views. Also, the drawings are not necessarily to scale, emphasis instead being placed upon illustrating the principles of the invention.

DETAILED DESCRIPTION OF PREFERRED EMBODIMENTS

Reference will now be made in detail to the present preferred embodiments of the invention, example of which are illustrated in the accompanying drawings. The method and corresponding steps of the invention will be described in conjunction with the detailed description of the system.

Figure 1:
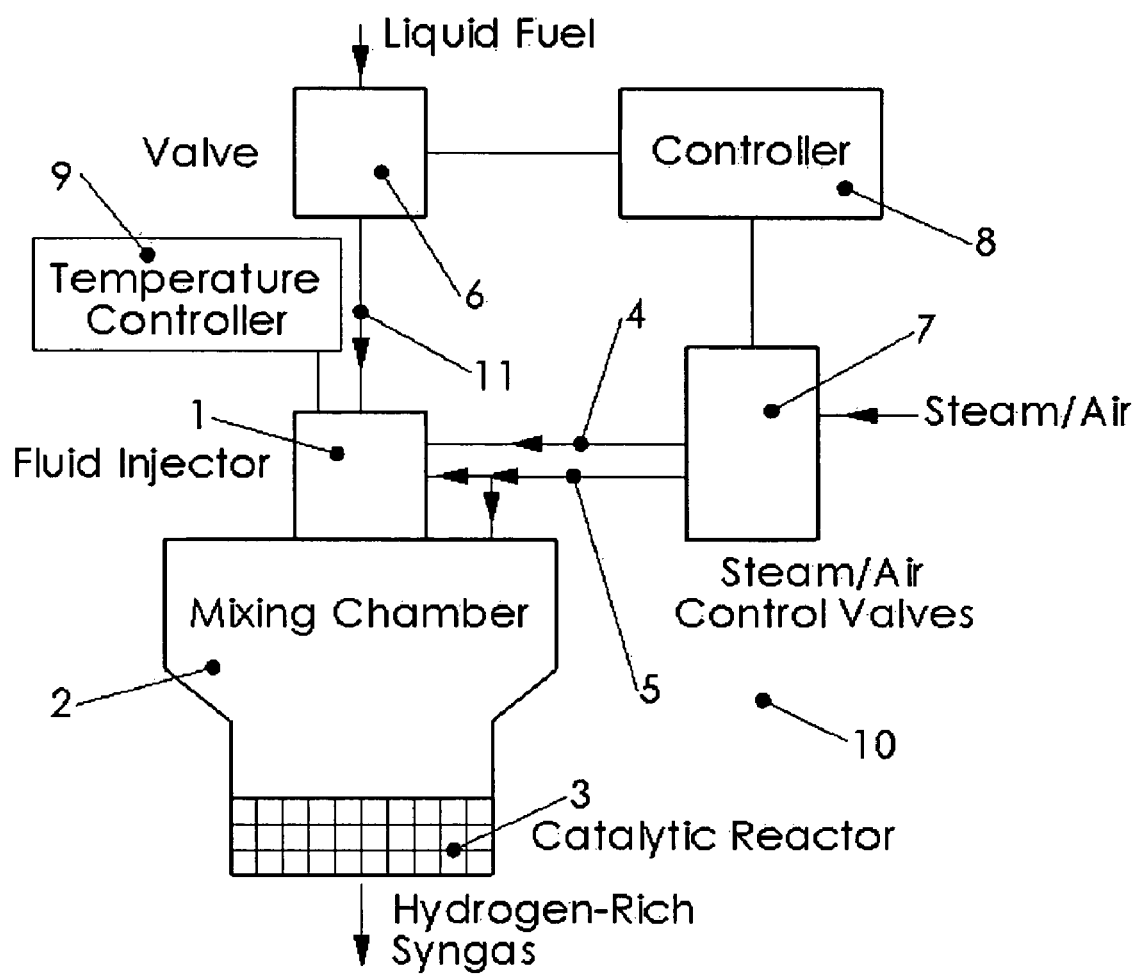
FIG. 1 is a schematic diagram of a fuel reformer system.
Figure 2:
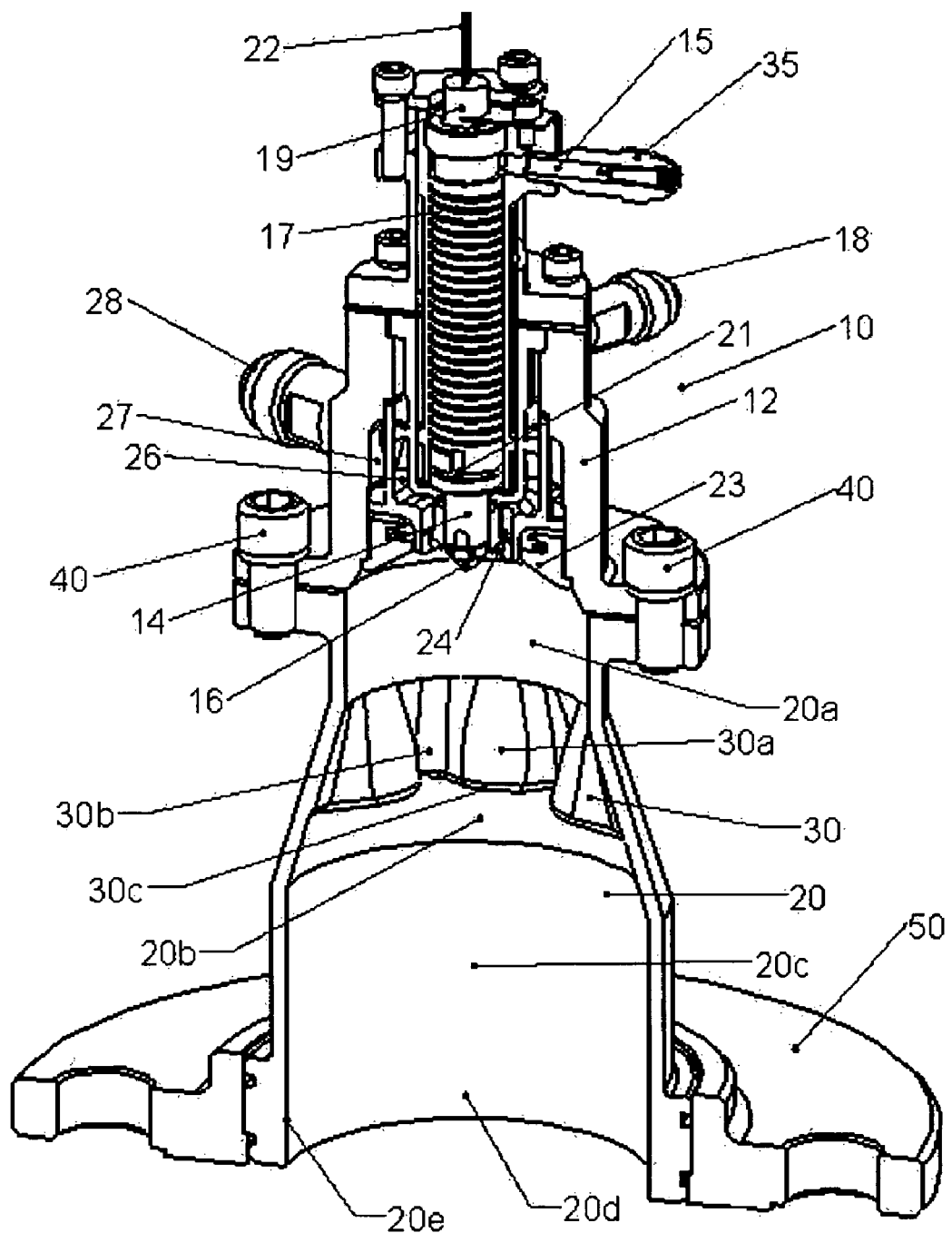
FIG. 2 provides a cut-away view of an illustrative embodiment of an integrated fuel injection and mixing system in accordance with the present invention.

For purpose of explanation and illustration, and not limitation, a partial view of an exemplary embodiment of the fuel injection and mixing system in accordance with the invention is shown in FIG. 2 and is designated generally by reference character 10. Other embodiments of a fuel injection and mixing system in accordance with the invention, or aspects thereof, are provided in FIGS. 2-10, as will be described.

In accordance with a first aspect of the invention, a fuel injection system is provided. The system includes an injector body having a fuel inlet and a fuel outlet, and defines a fuel flow path between the inlet and outlet.

For purposes of illustration only, and not limitation, as embodied herein and as depicted in FIG. 2, an integrated fuel injection and mixing system 10 is depicted for an auto-thermal-type reformer ("ATR"). The embodied injection and mixing system 10 includes a fuel injector 14, an injector housing 12, a mixing chamber 20, a mixer 30 and a mounting flange 50. The injection and mixing system 10 has the ability to atomize liquid hydrocarbon fuels and to achieve complete or nearly complete evaporation and mixing of the fuel within a short distance at various operating conditions.

In one aspect of the first embodiment of the present invention, the fuel injector 14 includes a fuel delivery device 16 that is operatively disposed in an injector housing unit 12. The fuel injector 14 is structured and arranged to aspirate and generate fine droplets of pressurized liquid fuel. In a preferred embodiment, system 10 is structured and arranged to include fuel preheating to provide fine fuel droplets with uniform or near uniform size distribution.

The injector-housing unit 12 is structured and arranged to be in communication with or otherwise operatively associated with the mixing chamber 20. Preferably, the injector housing unit 12 is removably attachable and securable to the inlet portion 20a of the mixing chamber 20, e.g., using cap screws 40, so that the housing unit 12 can be easily removed for scheduled and unscheduled maintenance or replacement purposes. It will be recognized that a myriad of ways to attach fuel injector housing unit 12 to mixing chamber 20 are possible, all of which are within the scope and spirit of this disclosure.

Figure 3:
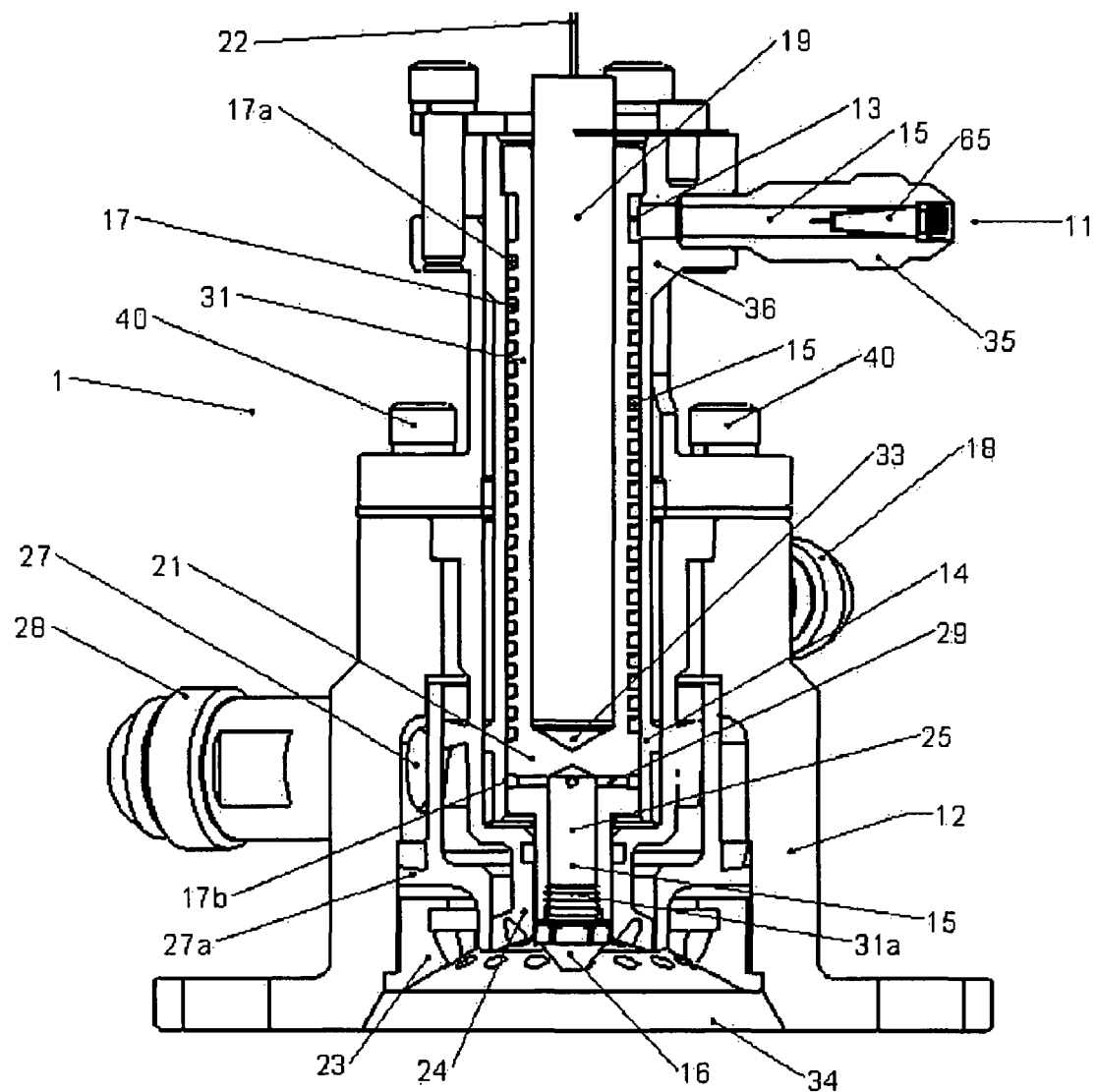
FIG. 3 provides a cross-section view of an illustrative embodiment of a fluid injector for the integrated fuel injection and mixing system of FIG. 2.

Referring to FIG. 3, the structure and operation of a preferred embodiment of a fuel injector 14 will now be described. FIG. 3 shows a cross section of a fuel injector 14 disposed in a housing unit 12 that is structured and arranged to employ gas-assisted pressure swirl and siphoning principles to provide fine fuel droplets of uniform or substantially uniform size, i.e., diameter. Preferably, fuel injector 14 includes body portion 31, fuel delivery device 16 and is surrounded by casing 36. Suitable materials for constructing injector 14 and housing unit 12 can include, for example, corrosion resistant stainless steel or super alloys such as 347 SS and Inconel 625.

In further accordance with the embodiment of FIG. 3, a fuel flow path 15 is provided through fuel injector 14. In operation, fuel is introduced through fuel inlet port 35 having a filter 65, and into an annular chamber 13. Annular chamber 13 is in fluid communication with a generally helical flow passage 17 on the injector body 31 having an inlet end portion 17a and terminating in annular reservoir 17b. Helical flow passage 17 winds axially through injector body 31, and is preferably of sufficient length to allow heat transfer from the heating cartridge 19 to the pressurized fuel 11 passing therethrough. As depicted, helical flow passage 17 is defined by grooves formed in injector body 31 and by casing 36.

Helical passage 17 is preferably coated with a carbon-resistant ceramic or a suitable polymeric coating. Suitable exemplary polymeric coatings are described, for example, in U.S. Pat. No. 6,630,244, the disclosure of which is incorporated by reference herein in its entirety. Additional examples of such coatings include those sold under the trade name Silcosteel® AC from Restek, Inc. Such coatings include, for example, multiple layers of fused silica applied to a metal surface, and are amenable to prevention of formation of carbon deposits thereon. Additional suitable coatings include, for example, diffused aluminide coatings, commercially available from Chevron U.S.A., Inc. The coating process is described in U.S. Pat. No. 6,803,029, which is incorporated by reference herein in its entirety. Disposing a carbon-resistant coating in helical passage 17, as well as other portions of fuel flow path 15, if desired, can significantly reduce the buildup of carbon deposits from the fuel, resulting in better injection system reliability.

From annular reservoir 17b of helical passage 17, fuel 11 continues through flow path 15 passing through at least one feed hole 29 into an expansion chamber 25. Passing heated, pressurized fuel 11 through one or more feed holes 29 into chamber 25 permits further atomization and expansion of fuel 11. Any suitable number of feed holes 29 can be used. As depicted, four feed holes 29 are used (and three are depicted) in the embodiment of FIG. 2 and FIG. 3 disposed circumferentially 90° apart about the expansion chamber 25. From chamber 25, fuel 11 is directed through a fuel delivery device 16 and into the mixing chamber 20.

Fuel delivery device 16 can be, for example, a simplex injector adapted and configured to convert fuel passing therethrough into a vaporized or nearly vaporized spray. As depicted, delivery device is removably attached to injector body 31 by way of a plurality of threads 31a. However, other methods of attachment of delivery device 16 to injector body 31 are possible, as are known in the art. A variety of other fuel delivery devices 16 can be used in accordance with the system of the invention. For example, a siphon-type injector, a duplex injector or a dual orifice injector can also be used, among others.

As indicated above, heating means may also be provided in thermal communication with the injector body 31. The heating means may be adapted and configured for maintaining the injector body 31 at a predetermined temperature to heat fuel traversing the flow path.

Figure 10:
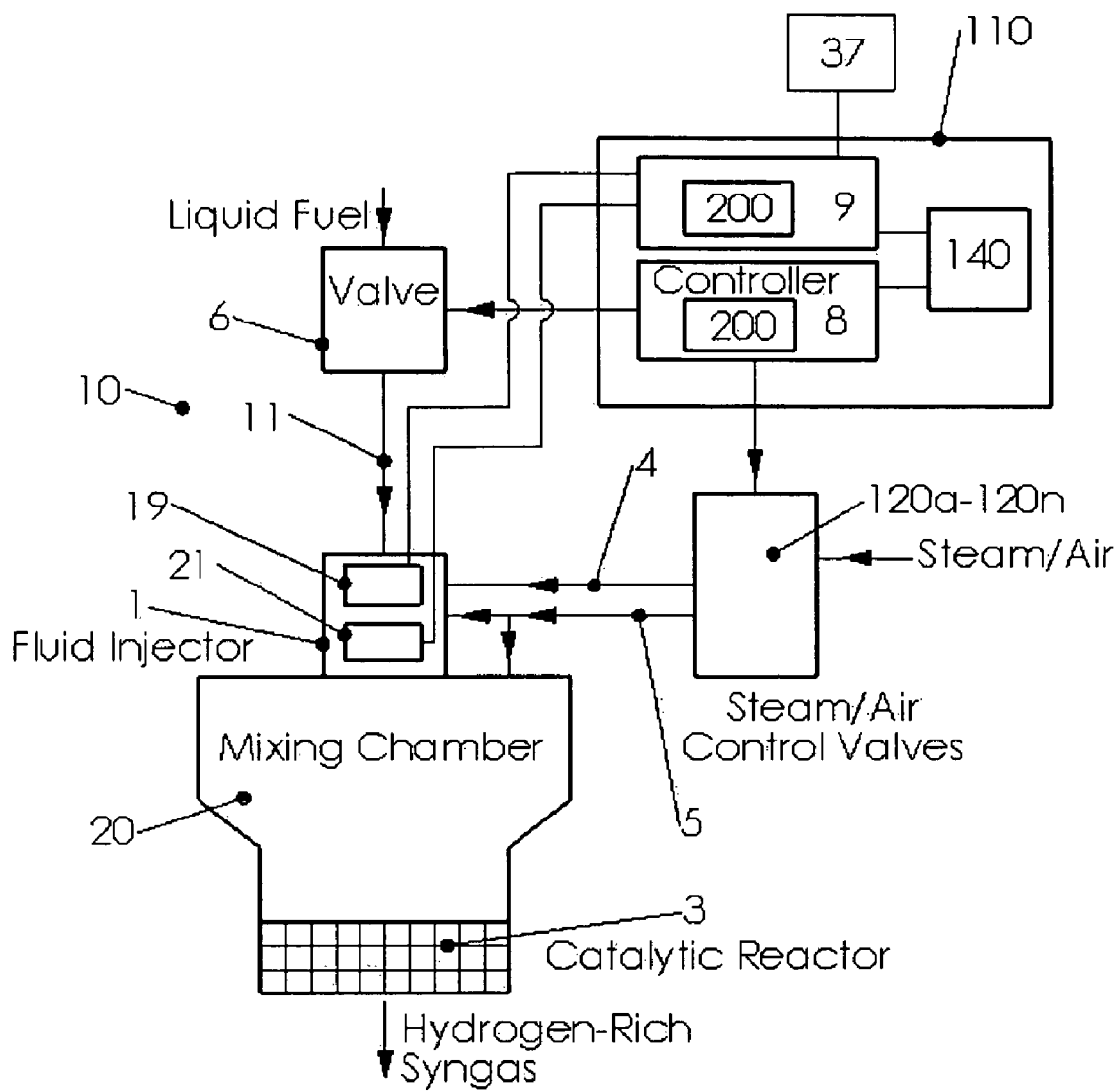
FIG. 10 is a schematic representation of a system made in accordance with the present invention.

For purposes of illustration and not limitation, as depicted in FIG. 3 and FIG. 10, a cartridge heater 19 is provided to heat the fuel 11 as it travels through helical passage 17. Cartridge heater 19 is embedded in a cavity 33 formed in the injector body 31. In addition, a thermocouple 21 is disposed in injector body 31 to provide temperature feedback to a temperature controller 9. The heating means can further include a power source 37 as schematically depicted in FIG. 10 to provide power for cartridge heater 19. Temperature controller 9 is in operable communication with the thermocouple 21, the cartridge heater 19, and the power source 37. Accordingly, the temperature controller 9 is adapted and configured to apply electrical power from the power source 37 to the cartridge heater 19 in response to a signal received from the thermocouple 21 indicative of the temperature of the fuel injector 14. Power to the cartridge heater 19 can be modulated by the temperature controller 9 to apply power to maintain fuel injector 14 at a predetermined temperature. In accordance with one aspect of the invention, the predetermined temperature is a constant over time, but can also be modulated over time in accordance with a predetermined temporal profile.

While heater 19 is depicted herein as a cartridge heater, other suitable types of heaters are possible, such as microwave heaters. Likewise, power source 37 can take on a variety forms, including induction heating, infrared and microwave energy.

As depicted, temperature controller 9 governs heating of fuel injector 14 by way of electrical connections 22. Thermocouple 21 can be disposed proximate the terminal end of helical passage 17 to indicate the temperature of fuel injector 14 at that point. If desired, additional thermocouples can be provided to determine the temperature at different points of injector body 31. The controller 9 would be suitably configured to respond to the temperature readings obtained at such different points.

In accordance with a further aspect of the invention, as depicted in FIG. 2 and FIG. 3, a mixing chamber 20 in fluid communication with the outlet 34 of injector housing 12 is provided for mixing fine droplets of liquid fluid from the fuel injector 14 with other fluids to provide a fuel vapor mixture, as described in more detail below.

Specifically, injector housing 12 includes an air injector 23 (FIG. 3) proximate fuel delivery device 16 for injecting air into the Mixing chamber 20 to facilitate creation of a fuel mixture proximate outlet 34 of injector housing 12. As depicted, injector housing 12 also includes a third injector 24 proximate fuel delivery device 16 for injecting another fluid into the mixing chamber 20. In the case of an autothermal reformer ("ATR"), injector 24 can be used to inject steam into mixing chamber 20. In the case of a catalytic partial oxidation reformer ("CPOX"), injector 24 can be used to inject hot air or gas recycled from the anode of a fuel cell into the mixing chamber 20. If desired, one or both of injectors 23, 24 can be adapted and configured in manners known to those skilled in the art to impart rotation to flow passing through the mixing chamber 20 to generate a whirling characteristic.

Figure 4:
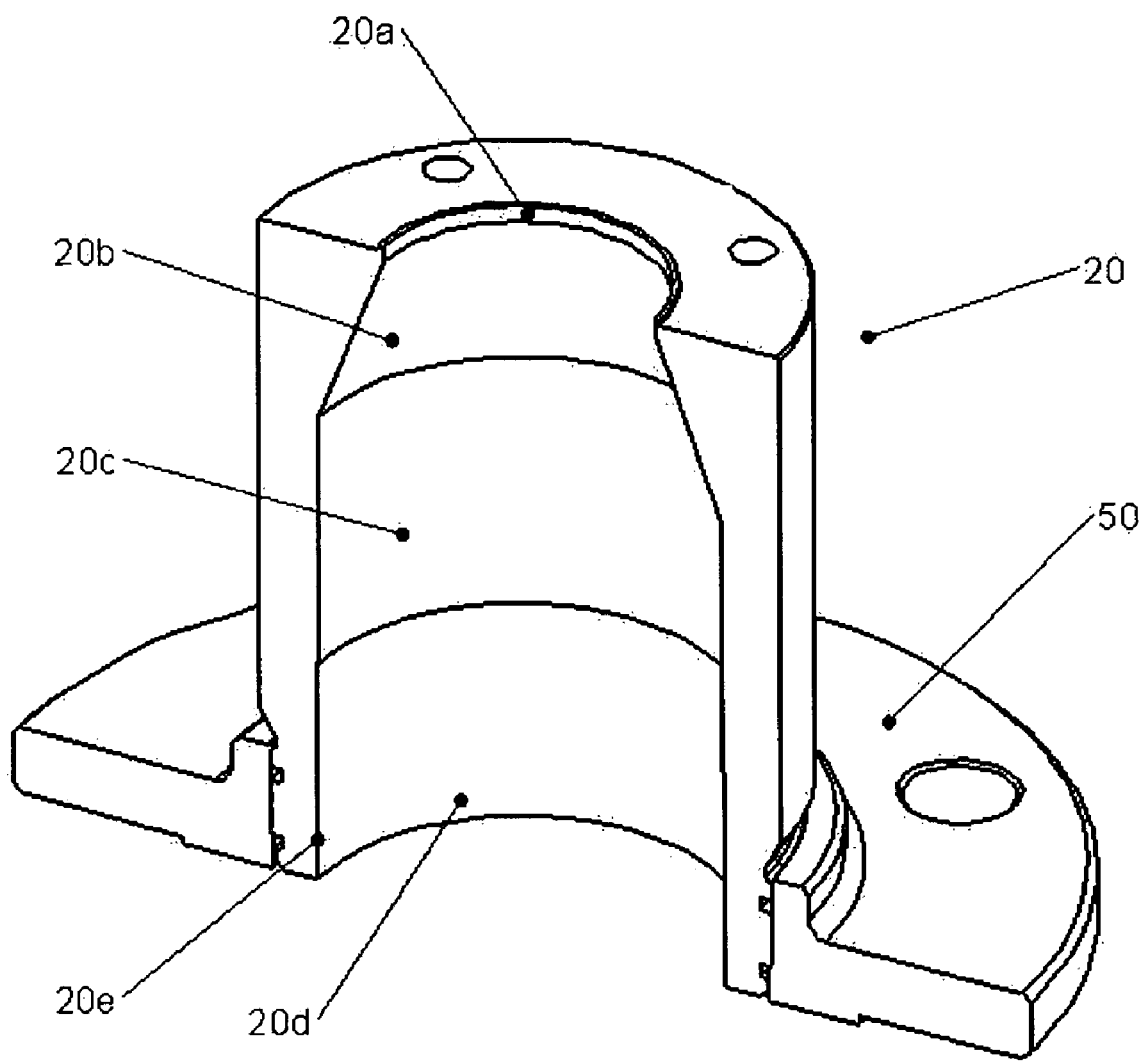
FIG. 4 provides a partial perspective view of an illustrative embodiment of a mixing chamber made in accordance with the present invention.
Figure 5:
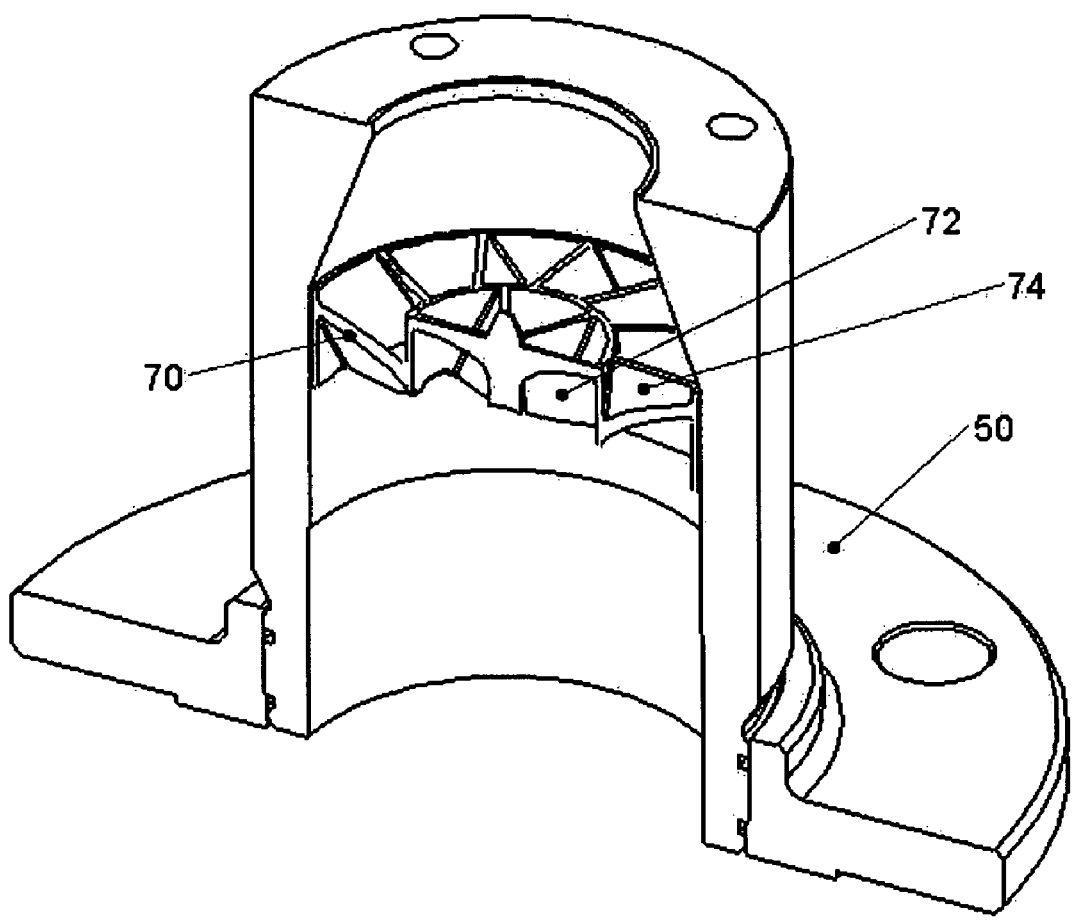
FIG. 5 provides a partial perspective view of an illustrative embodiment of a mixing chamber including a mixer made in accordance with the present invention.
Figure 7A:
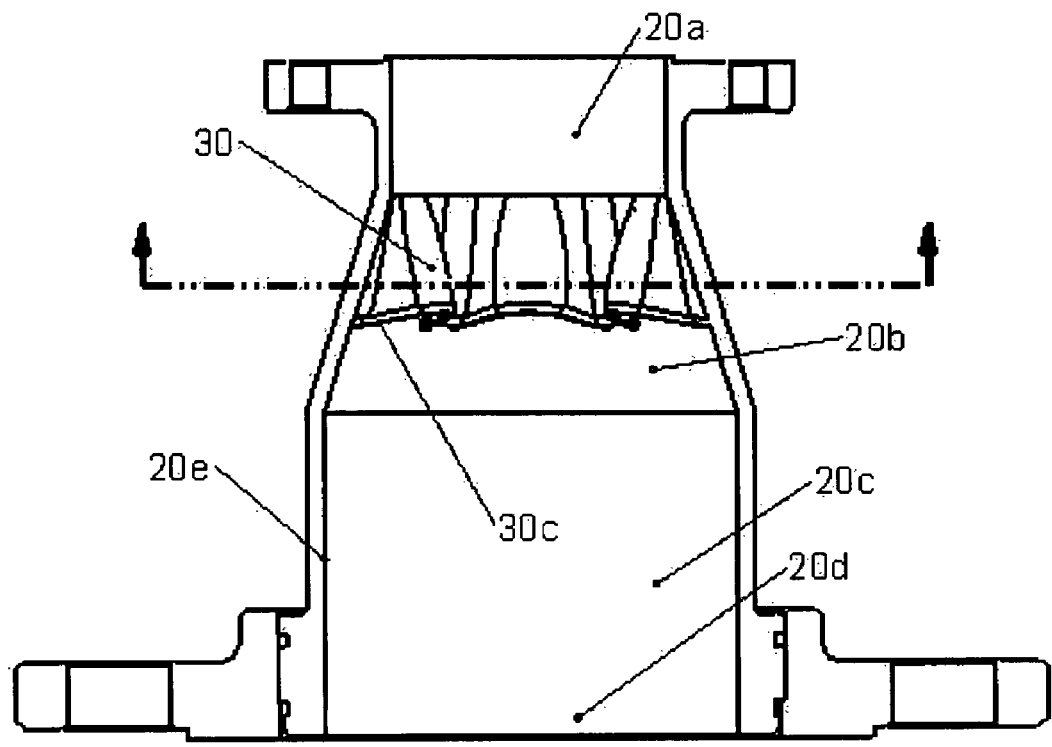
FIGS. 7(a)-7(b) provide cross sectional and end views, respectively, of an alternative embodiment of a mixing chamber made in accordance with the present invention.
Figure 7B:
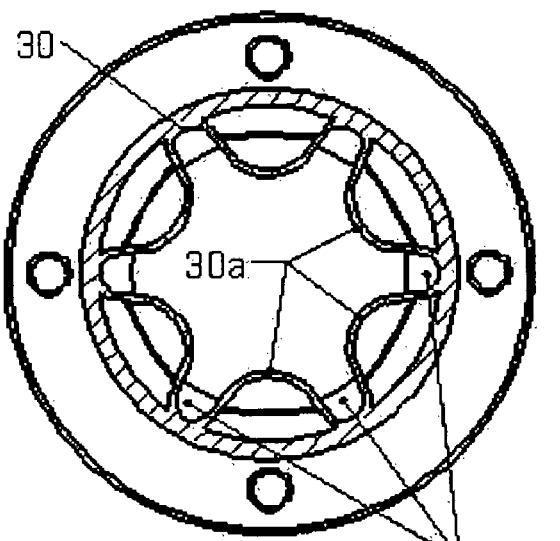

As further depicted in FIGS. 2, 4 and 7(a), mixing chamber 20 can include an inlet portion 20a disposed proximate the outlet 34 of injector housing 12, a neck portion 20b disposed downstream of the inlet portion, a body portion 20c disposed downstream of the neck portion 20b and an exit portion 20d. Mixing chamber 20 is further defined by a peripheral wall 20e. The contour of mixing chamber 20 is preferably diverging in the direction of fluid flow, as depicted, in order to permit further expansion and mixing of the fuel mixture.

As depicted in FIG. 3, fuel delivery device 16 is structured and arranged to align with injectors 23, 24 disposed inside the injector housing 12 of the fluid injector 1. Preferably, the fuel delivery device 16 is structured and arranged to align concentrically with injectors 23, 24. Injector 23 injects air into the mixing chamber 20 while injector 24 introduces steam, air or anode gas (depending on the application) into the mixing chamber 20 to form a fuel mixture with fuel introduced through fuel delivery device 16 in the region of outlet 34.

For example, in the case of auto-thermal reforming, high-temperature steam flow is supplied through an inlet port 18 and a steam injector 24 to assist in fuel atomization and mixing. Hot airflow is supplied through inlet port 28 and passage 27 into an air injector 23 (See FIG. 2). To ensure circumferential uniformity, the steam and air gasses are forced through multiple angled vanes 27a and sharp bends. The fuel spray, steam and air flows immediately begin to mix in front of outlet 34 of injector housing 12. Injecting air into the mixing chamber 20 along an external periphery via injector 23 helps to confine the spray rotating about the center of the mixing chamber 20 to keep the spray from fluttering or biasing off from a central direction of travel.

In accordance with a further aspect of the invention, the system also includes a mixer structured and arranged in the mixing chamber for stabilizing and mixing the fuel vapor mixture prior to introduction of said fuel vapor mixture through a fuel reformer entrance.

For purposes of illustration and not limitation, as embodied herein and as depicted in FIG. 2, after passing the chamber inlet section 20a, the fuel mixture next encounters a lobed mixer 30 as it progresses downstream. The mixer 30 includes a peripheral wall 30a having an axially converging undulating surface and a peripheral wall 30b having axially diverging undulating surface depending from a wall 20e of the mixing chamber 20. As depicted, the peripheral walls 30a and 30b of the mixer 30 are provided with a generally circular cross section that transitions into an undulating cross section in the direction of fluid flow. The undulating cross section of the peripheral wall 30a and 30b of the mixer 30 can be provided with a plurality of lobes 41. For example, the undulating cross section of the peripheral wall of the mixer 30 can include three or more interconnected lobes 41. In accordance with one embodiment, the cross section of the peripheral wall of the mixer 30 includes six interconnected lobes 41 as disclosed, for example, in FIG. 7(b). However, cross sections including any other number of lobes 41 (e.g., four, five, seven, eight, ten, twelve or more) are also possible and within the scope of the disclosure.

The trailing edge 30c of the lobed mixer 30 features a rippled surface and induces a myriad of vortices as the fuel mixture passes through, resulting in improved mixture uniformity. Mixer 30 plays a significant role in determining the degree of mixing and uniformity of the fuel mixture before the fuel mixture enters the catalytic reactor 3 (See FIG. 10). Mixer 30 also helps to reduce the mixture velocity that is induced by the high-speed fuel vapor and surrounding gas. Depending on the reformer requirements, the central mixer may have various designs, containing different spray mixers and mixing devices. These aspects and features of the invention are described in more detail below.

In accordance with one embodiment of the invention, the mixer 30 is disposed in the neck portion 20b of the mixing chamber 20. If desired, peripheral trailing edge 30c can be sloped along a radial direction to outwardly direct liquid droplets of fluid collecting on the peripheral undulating wall 30a and 30b of the mixer 30 toward the wall 20e of the mixing chamber 20 to prevent accumulated fuel from directly entering catalytic reactor 3 (See FIG. 10).

In accordance with one embodiment of the invention, FIG. 4 shows a perspective view of a simple mixing chamber 20 without any mixing devices therein. It features a short inlet section 20a, a diverging neck section 20b and a straight body section 20c. The shape and length of the mixing chamber 20 may vary depending on the characteristics of the fuel sprays, such as spray angle, pattern and velocity.

A variety of alternative mixing chamber designs can be constructed by using additional mixing devices to enhance mixture uniformity. For example, the embodiment of FIG. 5 utilizes a double-swirler mixer 70 that contains counter-rotating swirlers 72 and 74. The swirl direction of the inner swirler 72 is opposite to that of the outer swirler 74. The counter-rotating arrangement in a double-swirler mixer 70 provides desirable performance in terms of mixture uniformity and homogeneity. The operation and design of double-swirler mixer 70 is described in detail in copending U.S. patent application Ser. No. 11/108,066, the disclosure of which is incorporated by reference herein in its entirety.

Figure 6:
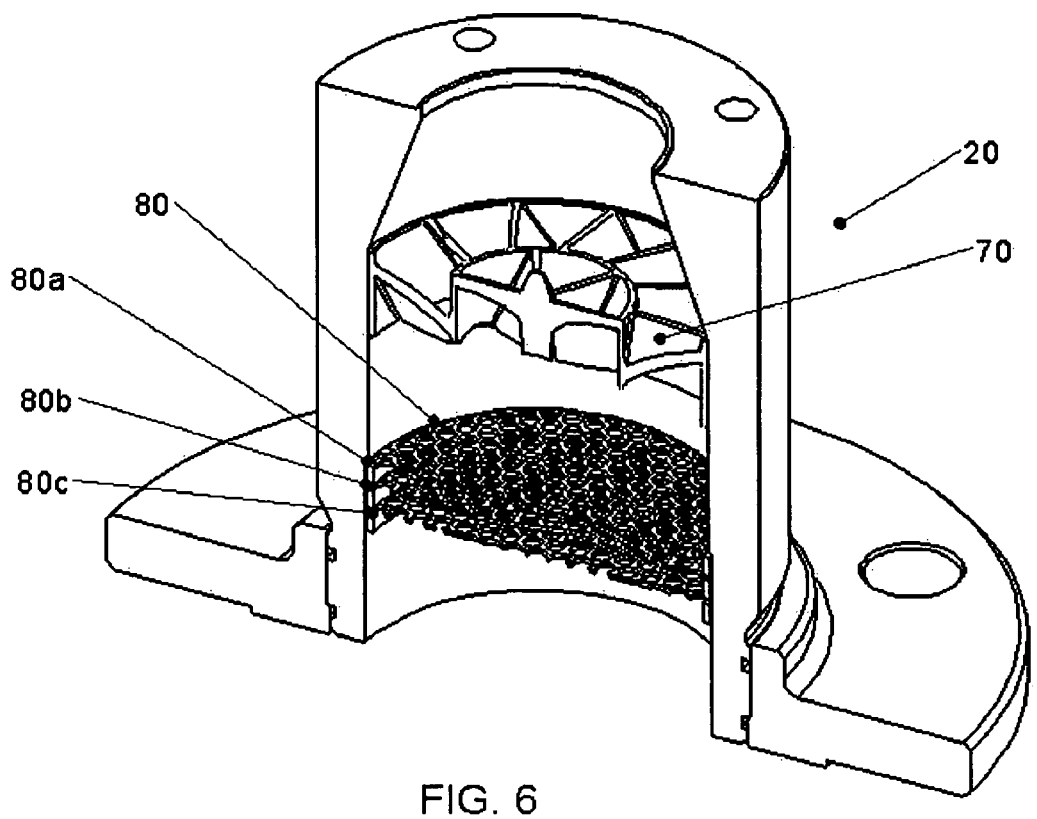
FIG. 6 provides a partial perspective view of an illustrative embodiment of a mixing chamber further including a plurality of perforated members in accordance with the present invention.

By way of further example, as depicted in FIG. 6, a mixing chamber 20 is provided further including a plurality of perforated members 80 disposed downstream of the double-mixer 70. The number of perforated members 80 and their porosity are selected to meet the mixing chamber pressure drop requirement. Preferably, the pressure drop across the perforated members should not exceed 10% of that specified for the injection and mixing system.

In one aspect of the present invention, the perforated members 80 are mesh screens made of a heat and corrosion resistant material, e.g., stainless steel and other alloys. The shape of the openings in the mesh can include circular, rectangular, trapezoidal, and any other geometric shape commercially available. Likewise, the size of the openings can be selected from what is commercially available. Those of ordinary skill in the art appreciate that the size and number of openings affect porosity and that porosity is inversely related to mixing, i.e., the lower the porosity, the greater the mixing. However, lower porosity leads to higher pressure loss through the entire fuel injection and mixing system. As a result, these two affects are balanced to provide the most desirable combination of mesh screens for a particular purpose.

Perforated members 80 can also be made from non-metallic materials. For example, perforated members can be made from various non metallic screens and porous materials, including, for example, a ceramic foam.

Although there are three perforated members 80a, 80b and 80c depicted in FIG. 6, the invention is not to be construed as being limited thereto. Indeed, those of ordinary skill in the art will appreciate that the number and porosity of the perforated members 80 can be selected to satisfy mixing chamber pressure drop requirements. For example, to achieve optimum mixing performance, it is preferable to use perforated members that collectively have a total porosity of about 70% or less. However, the invention is not to be construed as being limited thereto.

In one aspect of the present invention, the porosity of a single perforated member 80 can be from about 30 percent to about 80 percent. When a plurality of perforated members 80 are used, the porosity of the members can vary or can be the same. For example, for a system having three perforated members 80a, 80b and 80c, the uppermost and lowermost members 80a and 80c can have porosities of about 60 percent and the inner member 80b can have a porosity of about 40 percent. Those of ordinary skill in the art will appreciate the myriad combinations of porosities and the number of perforated members 80 to achieve a desired porosity and performance.

Figure 8:
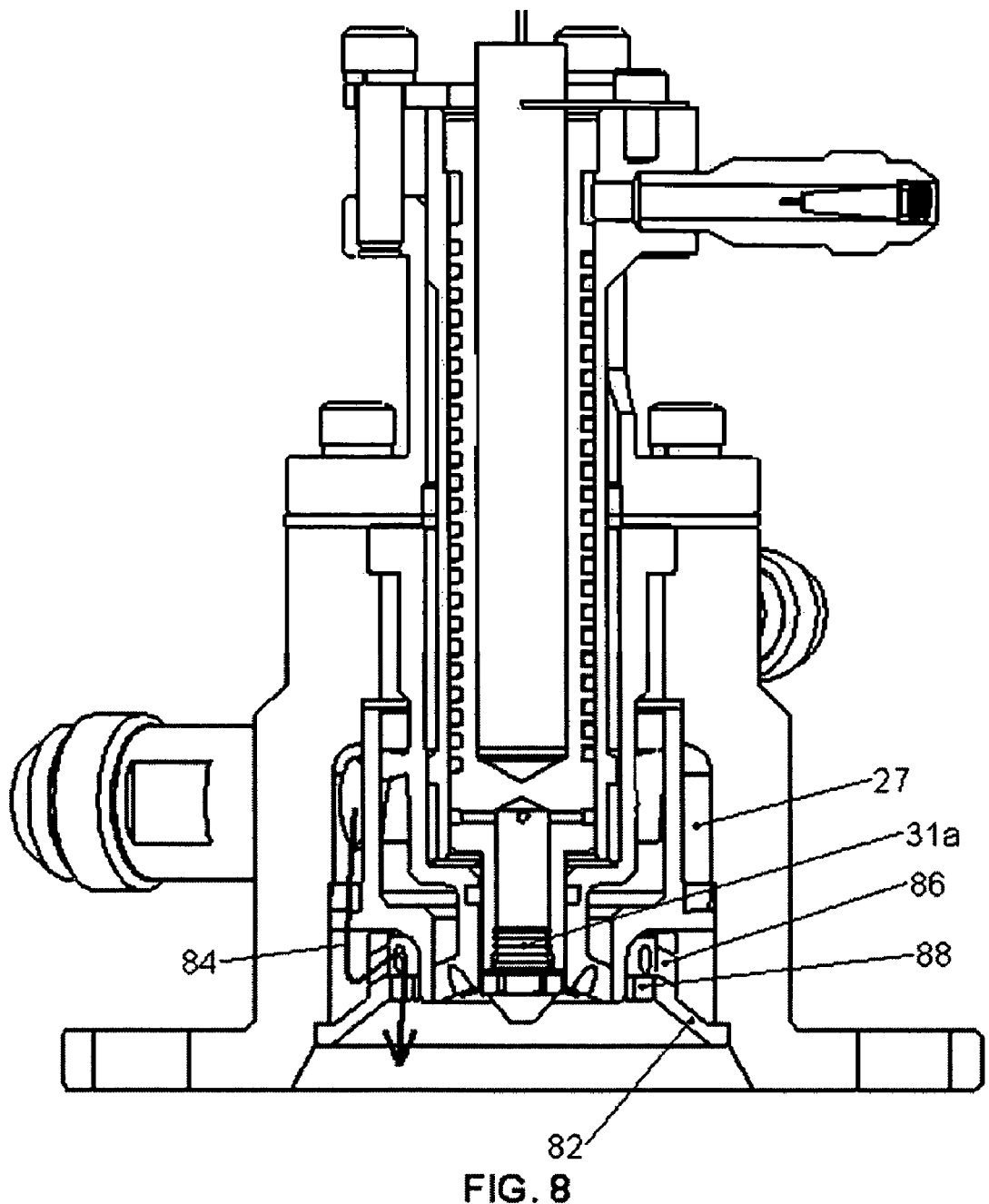
FIG. 8 provides a cross sectional view of an alternative embodiment of a fluid injector made in accordance with the invention.

FIG. 8 shows another injector housing embodiment that uses an air injector 82 of a design different from that shown in FIG. 3, to control the mixture pattern. Hot air enters into an annular passage 27 and follows a flow path 84 through angled holes 86 and straight holes 88 into the mixing chamber 20. The straight holes 88 at the exit of the air injector 82 are designed to keep the fuel mixture from attaching to the mixing chamber wall.

Figures 9A, 9B, 9C:
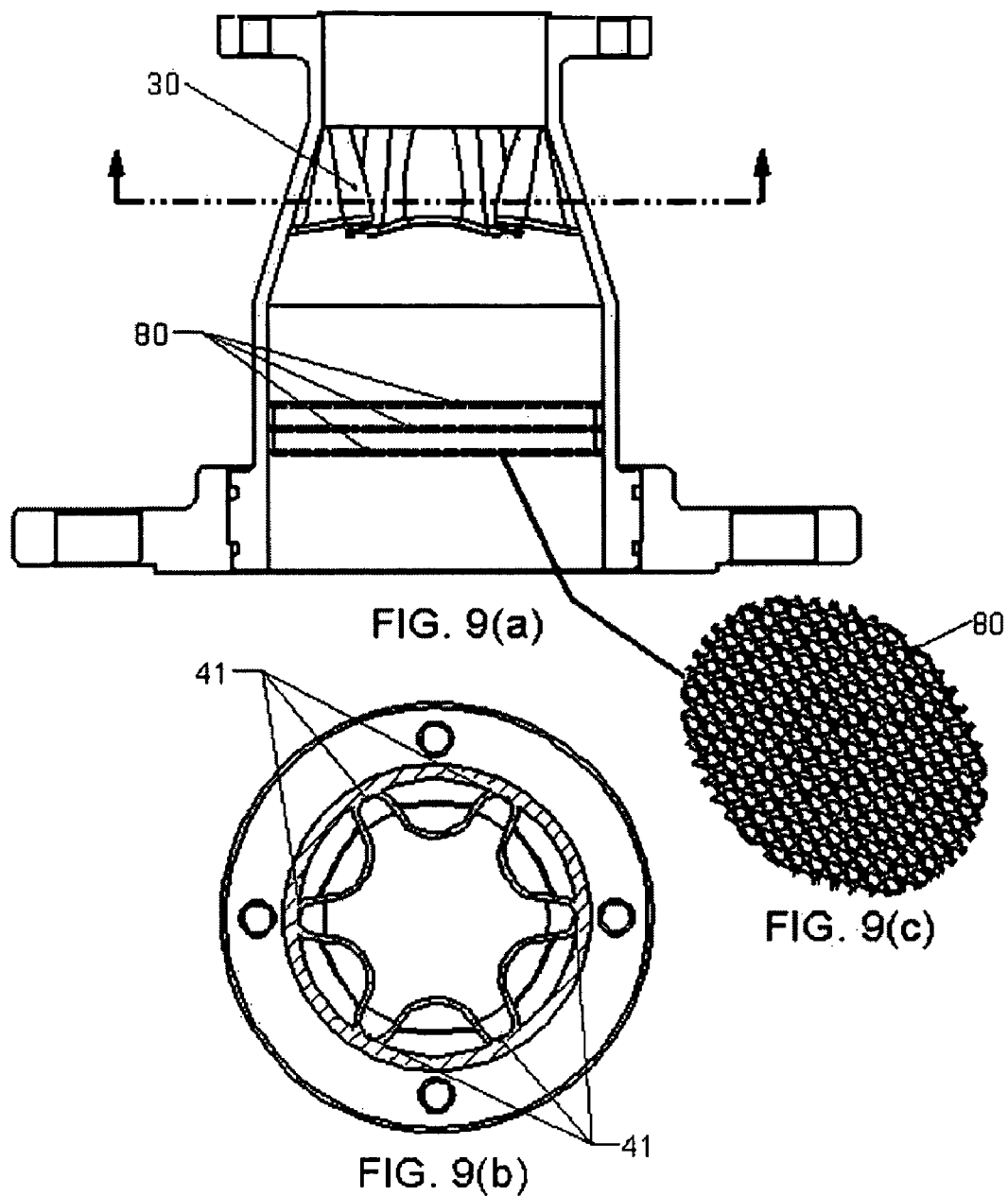
FIGS. 9(a)-9(c) show cross sectional views of a further alternate embodiment of a mixing chamber and a perforated member disposed in the mixing chamber in accordance with the present invention.

As further depicted in FIGS. 9(a)-9(c), a mixing chamber 20 is provided including a lobed mixer 30 with one or more perforated members 80. The optional addition of perforated members 80 further enhances the uniformity of the fuel vapor mixture. Moreover, perforated members 80 are effective in evenly redistributing the fuel vapor mixture near the entrance area of reactor 3.

In accordance with still a further aspect, the fuel injection and mixing system can further include a control system for controlling the flow of fluids into the mixing chamber to form a fuel vapor mixture.

For purposes of illustration and not limitation, as embodied herein and as depicted in FIG. 10, system 10 can include a control system 110 and at least one controllable valve 120a-n, wherein each controllable valve 120 is adapted and configured to control the flow of fluids into the system 10. The control system 110 can accordingly include a valve controller 8 operably coupled to the plurality of valves 120, wherein the valve controller 8 is adapted and configured to control the flow of fluids into the system by operating the controllable valves 120. Control system 110 can be further coupled to a heating system as described herein for preheating the fuel 11 passing through the fuel injector 14. As described herein, the heating system can include a thermocouple 21, a heater 19, a power source 37 and a temperature controller 9 in operable communication with the thermocouple 21.

By way of further example, if desired, the control system 110 can be automated and programmable. As such, control system 110 can further include a machine readable program containing instructions for controlling the fuel injection system 10.

The machine readable program is adapted to be read by processors 200 in valve controller 8 and temperature controller 9 in order to operate various portions of system 10 in accordance with the methods of operation embodied herein. Valve controller 8 and temperature controller 9 may be separate components, or integrated to act as a single controller having one or more processors 200. The computer program may be embodied either in software or in hardware, such as a memory chip 140 in the system 10 for controllers 8, 9 to access when needed. Computer program may alternatively be embodied in a software program and run from a computer located inside or outside of the device.

The computer program may be written using techniques well known in the art. The computer program in accordance with the invention has instructions therein for operating the system 10. The program can include, for example, means for operating the temperature controller 9 to maintain the temperature of the injector body at the predetermined temperature and for heating fuel traversing the flow path. If desired, the program can also include means for operating the valve controller 8 to modulate the flow of fluids into the system to form a fuel mixture in the mixing chamber.

It is another object of the present invention to provide an integrated fuel injection and mixing system that can be easily modified to work for other types of fuel reformers. In the case of a steam reformer (SR) and a catalytic partial oxidation (CPOX) reformer, there are only two feed streams connected to the injector unit. Slight modification can be made to the injector described in FIG. 3 for ATR applications, and quickly adapt the injection system to meet their operational requirements. In the case of CPOX operation, hot air flow would be supplied through the inlet port 18. The air fitting 28 and air injector 23 would be eliminated, or used for anode recycle gas. For SR applications, the inlet port 18 would be used to deliver steam flow and the air fitting 28 could be either blocked or used for anode recycle gas.

In accordance with another aspect, the invention provides a method of providing a homogenous fuel vapor mixture. The method may be performed with devices as described herein, as well as others.

For purposes of illustration and not limitation, as embodied herein, the method includes the steps of directing fuel 11 into the fuel inlet 35 of a fuel injector 14 along a predetermined fuel flow path 15. The method can further include simultaneously heating and pressurizing the fuel 11 traversing the fuel flow path 15 and then expanding the heated and pressurized fuel so as to promote atomization. The expansion and atomization can occur, for example, by directing the fuel into an expansion chamber 25 after heating and pressurization, as embodied herein. After expansion, the vaporizing fuel can then be directed through a fuel delivery device 16 to mix with other fluids.

In accordance with a further aspect, the method can include the step of directing fuel 11 from the injector into a mixing chamber 20 described herein. If desired, a second fluid can be introduced into the mixing chamber (such as through injector 24) to form a fuel mixture. The second fluid can be steam, for example. A third fluid can also be introduced into the mixing chamber to modify the fuel mixture. The third fluid can be hot air or anode gas recycled from an anode of a fuel cell, for example.

In accordance with still a further aspect, the fuel can be heated by applying heat to the fuel injector 14. The injector 14 can be maintained at a predetermined temperature, if desired. The predetermined temperature can be selected to establish two-phase fuel flow through at least a portion of the fuel flow path 15. Furthermore, the predetermined temperature can be selected so as to evaporate all of the fuel to establish a gas flow through at least a portion of the fuel flow path 15. The method may also include the step of delivering fuel to an entrance of a fuel reformer such as catalytic reformer 3 (FIG. 10). The method described herein can be used with any of the systems described herein as well as others.

The fuel injection and mixing system described herein has many applications, including in oil burners and combustion systems to assist fuel atomization and control of gas emissions. For example, if desired, system 10 can be integrated with an internal combustion engine to provide a uniform, vaporized fuel-gas mixture for combustion or can be mounted downstream within the engine exhaust system to treat the exhaust gas for NOx reduction.

Having described certain embodiments of the invention, it will be apparent to those of ordinary skill in the art that other embodiments incorporating the concepts disclosed herein may be used without departing from the spirit and scope of the invention. The described embodiments are to be considered in all respects as only illustrative and not restrictive.

What is claimed is:

1. A fuel injection system, comprising:
   a) an injector body having a fuel inlet and a fuel outlet, and defining a fuel flow path therebetween, the fuel flow path having:
      i) a generally helical flow passage having an inlet end portion disposed proximate the fuel inlet of the injector body;
      ii) an expansion chamber downstream from and in fluid communication with the helical flow passage, wherein an outlet end portion of the helical flow passage is connected to the expansion chamber by way of at least one feed hole, and
      iii) a fuel delivery device in fluid communication with the expansion chamber for delivering fuel; and
   b) elongated heating means extending along an axial length of the injector body, the helical flow passage surrounding the heating means, the heating means being in thermal communication with the injector body, the heating means adapted and configured for maintaining the injector body at a predetermined temperature to heat fuel traversing the flow path.

2. The fuel injection system of claim 1, wherein the flow path further includes an annular cavity in fluid communication with and located between the helical flow passage and the fuel inlet.

3. The fuel injection system of claim 1, wherein the heating means includes a thermocouple in thermal communication with a portion of the injector body, the thermocouple being adapted and configured to detect the temperature of the injector body.

4. The fuel injection system of claim 1, wherein at least a portion of the flow path is coated with a coating resistant to formation of carbon deposits thereon.

5. The fuel injection system of claim 4, wherein the coating is chosen from the group consisting of polymeric materials, ceramic materials, diffused aluminide and fused silica.

6. A fuel injection system, comprising:
   a) an injector body having a fuel inlet and a fuel outlet, and defining a fuel flow path therebetween, the fuel flow path having:
      i) a generally helical flow passage having an inlet end portion disposed proximate the fuel inlet of the injector body;
      ii) an expansion chamber downstream from and in fluid communication with the helical flow passage, wherein an outlet end portion of the helical flow passage is connected to the expansion chamber by way of at least one feed hole, and
      iii) a fuel delivery device in fluid communication with the expansion chamber for delivering fuel; and
   b) heating means in thermal communication with the injector body, the heating means adapted and configured for maintaining the injector body at a predetermined temperature to heat fuel traversing the flow path;
   c) wherein the heating means further includes a cartridge heater adapted and configured to heat the injector body.

7. The fuel injection system of claim 6, wherein the heating means further includes:
   a) a thermocouple in thermal communication with a portion of the injector body, the thermocouple being configured to detect the temperature of the injector body;
   b) a power source; and
   c) a temperature controller, the temperature controller in operable communication with the thermocouple, the cartridge heater, and the power source, wherein the temperature controller is adapted and configured to apply electrical power from the power source to the cartridge heater in response to a signal received from the thermocouple, the signal being indicative of the temperature of the injector body.

8. A fuel injection and mixing system comprising:
   a) an injection housing including:
      i) an injector body having a fuel inlet and a fuel outlet, and defining a fuel flow path therebetween, the fuel flow path having:
         1) a generally helical flow passage having an inlet end portion disposed proximate the fuel inlet of the injector body;
         2) an expansion chamber downstream from and in fluid communication with the helical flow passage by way of at least one feed hole, and
         3) a fuel delivery device in fluid communication with the expansion chamber for delivering fuel;
      ii) elongated heating means extending along an axial length of the injector body, the helical flow passage surrounding the heating means, the heating means being in thermal communication with the injector body, the heating means adapted and configured for maintaining the injector body at a predetermined temperature to heat fuel traversing the flow path; and
      iii) at least one injector for injecting a second fluid;
   b) a mixing chamber in fluid communication with the outlet of the injector housing for atomizing and mixing fine droplets of fuel from the fuel delivery device with the second fluid to provide a fuel vapor mixture; and
   c) a mixer structured and arranged in the mixing chamber for stabilizing and mixing the fuel vapor mixture.

9. The fuel injection and mixing system of claim 8, further comprising a control system for controlling the flow of fluids into the mixing chamber to form the fuel vapor mixture.

10. The fuel injection and mixing system of claim 9, further comprising:
   a) a plurality of controllable valves, each controllable valve adapted and configured to control the flow of fluids into the system, and wherein the control system includes a valve controller operably coupled to the plurality of valves, the valve controller being adapted and configured to control the flow of fluids into the system by operating the controllable valves.

11. The fuel injection and mixing system of claim 10, wherein the heating means includes:
   a) a thermocouple disposed on the injector body adapted and configured to measure the temperature of the injector body;
   b) a heater disposed in the injector body, the heater being adapted and configured to heat fuel traversing the flow path;
   c) a power source; and
   d) a temperature controller in operable communication with the thermocouple, the heater and the power source, the temperature controller being adapted and configured to apply electrical power from the power source to the heater in response to a signal received from the thermocouple indicative of the temperature of the injector body.

12. The fuel injection and mixing system of claim 11, wherein the control system further includes a machine readable program containing instructions for controlling the fuel injection system, wherein the program comprises:
   a) means for operating the temperature controller to maintain the temperature of the injector body at the predetermined temperature and for heating fuel traversing the flow path; and
   b) means for operating the valve controller to modulate the flow of fluids into the system to form a fuel mixture in the mixing chamber.

13. A method of providing a fuel vapor mixture comprising the steps of:
   a) directing fuel into an injector body along a predetermined fuel flow path between a fuel inlet and a fuel outlet of the injector body, the fuel flow path having a generally helical flow passage with an inlet end portion disposed proximate the fuel inlet of the injector body;
   b) simultaneously heating and pressurizing the fuel traversing the fuel flow path using an elongated heating means extending along an axial length of the injector body, wherein the helical flow passage surrounds the heating means, the heating means being in thermal communication with the injector body and being adapted and configured to maintain the injector body at a predetermined temperature to heat fuel traversing the flow path;
   c) expanding the heated and pressurized fuel so as to promote atomization;
   d) atomizing the expanded fuel; and
   e) directing the fuel through a fuel delivery device.

14. The method of claim 13, further comprising the step of directing fuel from the fuel delivery device into a mixing chamber.

15. The method of claim 14, further comprising the step of introducing a flow of a second fluid into the mixing chamber to form a fuel mixture.

16. The method of claim 15, further comprising the step of introducing a flow of a third fluid into the mixing chamber to modify the fuel mixture.

17. The method of claim 16, wherein the third fluid is anode gas recycled from an anode of a fuel cell.

18. The method of claim 13, wherein the predetermined temperature is sufficient to establish two-phase fuel flow through at least a portion of the fuel flow path.

19. The method of claim 13, wherein the predetermined temperature is sufficient to evaporate all of the fuel to establish a gas flow through at least a portion of the fuel flow path.

* * * * *